Patented Nov. 20, 1928.

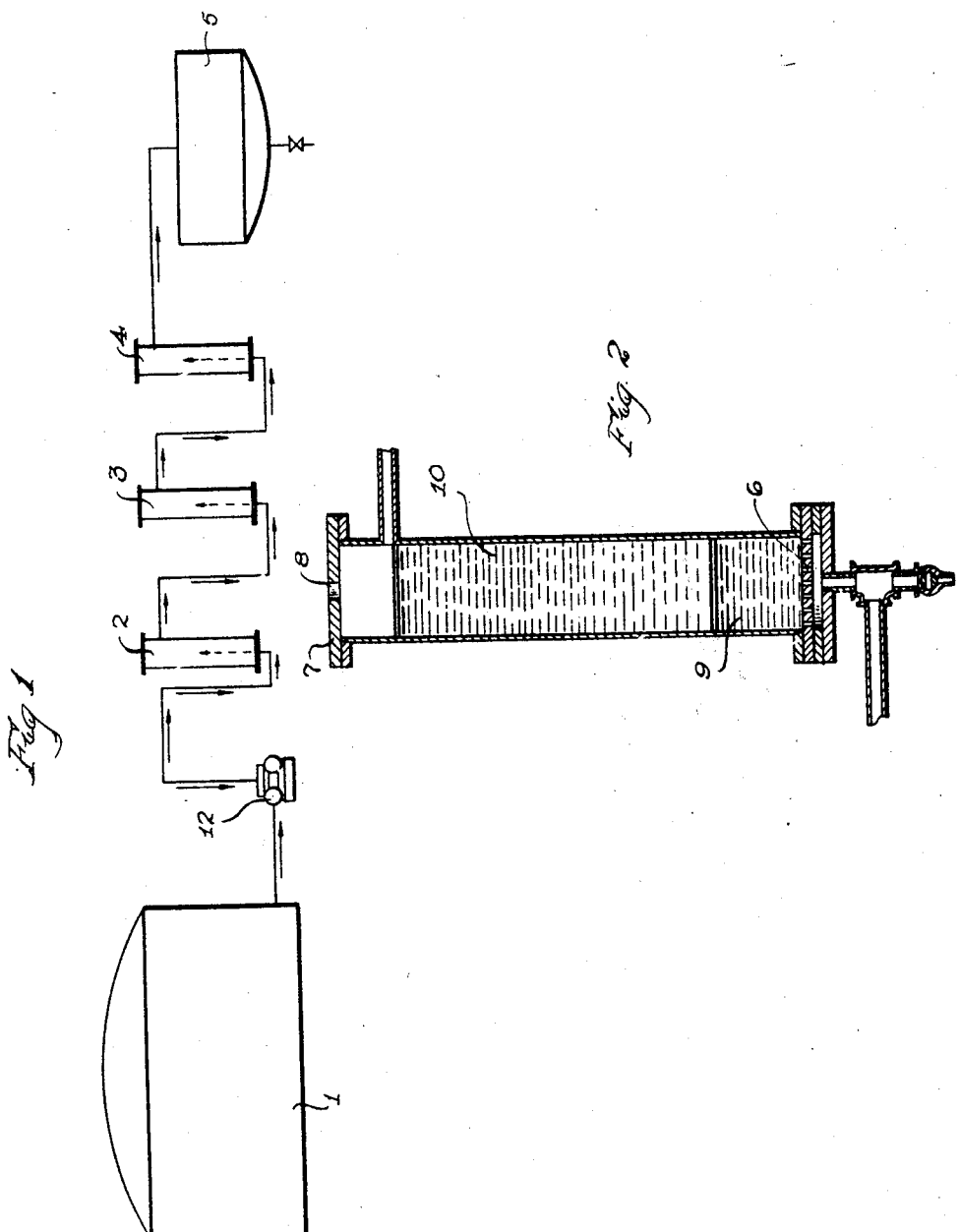

1,692,756

UNITED STATES PATENT OFFICE.

ROBERT C. MORAN, OF WOODBURY, NEW JERSEY, ASSIGNOR TO VACUUM OIL COMPANY, OF NEW YORK, N. Y., A CORPORATION OF NEW YORK.

DESULPHURIZING HYDROCARBON OILS.

Application filed January 18, 1927. Serial No. 161,784.

The invention relates to processes for the removal or reduction of the sulphur contents of hydro-carbon oils, particularly petroleum, shale oil and other mineral oils, and more particularly their products.

The invention will be described more particularly with regard to the treatment of petroleum, and particularly its distillates or products, as motor fuel and lamp oil, which for brevity, will be termed "light distillates".

Light distillates of the character referred to usually contain sulphur, either in the free or in the combined state, or in both states. The free or elementary sulphur, as well as numerous forms of the combined sulphur, have a corrosive effect on copper, determinable by the well-known "copper dish test" (Technical Paper, Bureau of Mines, No. 323A, page 86, "United States Government Specifications for Lubricants and Lubricants and Liquid Fuels and Methods for Testing"), in accordance with which the oil is evaporated to dryness in a polished copper dish and the presence of black corrosion noted. Free or elementary sulphur and those compounds of sulphur which so effect corrosion are for brevity herein and in the appended claims termed "corrosive sulphur".

Certain forms of the combined sulphur react to the well-known "doctor test" (aforesaid technical paper, page 85), which consists in shaking the oil with a water solution of sodium plumbite and powdered sulphur. These compounds give a discoloration of the powdered sulphur and/or oil, and the oil containing them is known as "sour". These compounds are for brevity herein termed "sour sulphur".

Sulphur beyond certain limits and in certain forms is objectionable in light distillates intended for motor fuel or lamp oil, because of odor, instability or corrosive action. According to the United States Government specification (aforesaid technical paper), motor fuel and lamp oil must not have a sulphur content beyond certain specified limits, and, furthermore, must be sweet or free from sour sulphur. A further specification in the case of motor fuel is that it must contain no corrosive sulphur.

The most generally used reagent for purifying and de-sulphurizing light distillates is sulphuric acid. When light distillates are refined by treating with sulphuric acid, which treatment may or may not have been preceded by a treatment for the removal of sour sulphur and followed by washing with water and/or hydroxide solution, the purified distillates are not always free from corrosive sulphur. The so-purified distillates always contain corrosive sulphur if free or elementary sulphur be present in the original distillates, or if free or elementary sulphur be formed through chemical interaction during the refining operation, or if an excess of free or elementary sulphur be used in the process of removing sour sulphur from the original distillates.

Light distillates, desulphurized by the use of sulphuric acid, which are still corrosive are customarily subjected to a redistillation operation in order to obtain non-corrosive products. This re-distillation operation is, economically, decidedly disadvantageous, involving as it does, practically unavoidable handling losses, distillation losses, etc. Furthermore, the re-distilled product may be sour as a result of the development of sour sulphur during the re-distillation operation. In this event, the redistilled product must be further purified to remove the sour sulphur.

Processes, which do not involve redistillation, have been proposed for the removal of corrosive sulphur from light distillates which may or may not have been previously refined to remove all or a portion of the sour sulphur content. Such processes usually involve the use of heat or a blending operation. Against these processes, which involve the use of heat to produce the desired effects, may be cited the disadvantage of practically unavoidable handling and treating losses, while against blending processes may be cited the disadvantage of the rigidity of control required to ensure their successful operation.

It has long been known that corrosive sulphur can be removed from petroleum by subjecting such oil or its vapor of distillation to contact with molten metals (lead, tin, zinc, mercury, antimony) or metals in a finely-divided condition (iron, copper, antimony).

In the practical adaptation of metals for desulphurizing purpose, the difficulty met with is that the surface of the metal so soon becomes coated with sulphide as to render it inactive, or practically so, for purpose of purification, and unless some means be employed for cleansing the metal so as to present fresh metallic surfaces to the sulphur in the oil, this method of purification cannot be economically practiced.

Of the metals mentioned above as desulphurizing agents, mercury has specially attractive characteristics. It is the most reactive towards corrosive sulphur; in fact, its reactivity is of such an order that it can produce a desulphurizing effect on an oil under substantially atmospheric temperature conditions which can be equalled or approached by the other metals, mentioned above only when heat is applied as a necessary adjunct. Furthermore, mercury is the only one of the above mentioned metals, by treatment with which at substantially atmospheric temperatures a corrosive oil can be rendered at once sweet or free of sour sulphur as well as noncorrosive or free of corrosive sulphur.

Another specially attractive characteristic of mercury is its molten condition at ordinary temperatures which tends to simplication in treating technique.

Furthermore, the by-product sulphureted mercury can be readily resolved into free mercury, thereby permitting the economic recovery of the metal from the by-product.

In spite of these specially attractive characteristics of mercury as a desulphurizing agent, no practical process has been proposed, in so far as I am aware, for its use as such, because of the difficulty in cleansing the metal in a practical way so as to present the necessary fresh metallic surfaces to the sulphur content of the oil.

I have discovered that the application of mercury for desulphurizing purposes can be made practical by treating the mercury chemically during the desulphurizing process to wash out or remove the sulphureted mercury from the mercury. I have also found that the best results are secured by maintaining the body of mercury in contact with the chemical, which preferably is in the form of a water solution of an alkali sulphide with or without an alkali hydroxide superimposed on the body of mercury, the hydrocarbon oil being passed upwardly through the mercury and the water solution so that the sulphureted mercury is washed out of the mercury and a fresh metallic surface is continually presented to the sulphur in the oil. The materials I have found to give the best results in the water solution are sodium or potassium sulphide or mixtures thereof with or without the addition of sodium or potassium hydroxide or mixtures thereof, but I do not limit myself to the use of any particular composition for the cleansing solution. Solutions of sodium or potassium sulphide or mixtures thereof in water of various concentrations can be used for effecting the necessary cleansing of the mercury, but I have found it technically advantageous to use concentrated solutions particularly because of the increased solubility therein of sulphureted mercury. I have found it particularly advantageous to add sodium or potassium hydroxide or mixtures thereof to such concentrated solutions of sodium or potassium sulphide or mixtures thereof in water in order to increase their solvent action on sulphureted mercury.

In the application of my invention, I do not limit myself to any particular method for applying the cleansing solution. It can be applied intermittently or constantly, but I prefer to keep it constantly in contact with the metallic mercury during the desulphurizing of an oil in order to maintain a maximum total desulphurizing effect for a given amount of mercury under a given set of conditions.

In carrying out my invention I arrange for replacement of the cleansing solution according as it becomes saturated with sulphureted mercury. I do not limit myself to any particular method for effecting this replacement of cleansing solution since it can be done in any convenient manner.

Furthermore, my invention is adaptable not only to the batch method of treating but also to the continuous method. The continuous method, I prefer, because of technical advantages involved.

To illustrate my invention, I will describe the purification and desulphurization, in a continuous manner, of motor fuel distillate to which my invention is particularly adaptable but not necessarily confined. Before doing so, I will describe the apparatus which I have successfully used, but I make no claim to any apparatus since my invention may be applied in any apparatus of convenient construction.

An apparatus in which I have successfully applied my invention is shown in the accompanying drawings in which:

Fig. 1 is a diagrammatic view of an apparatus which may be employed for carrying out the invention; and Fig. 2 is a sectional view through one of the reaction vessels.

This apparatus comprises, respectively, storage tank 1, a battery of three reaction vessels 2, 3 and 4 and a settling tank 5.

The individual reaction vessel consists of a 5 foot length of 12 inch standard iron pipe, having a bottom distributing plate containing 34 holes, 6 each, $\frac{1}{16}$ of an inch in diameter, and a top plate 7 carrying a filling hole 8, 1 inch in diameter. Each of the individual reaction vessels receives a charge of mercury 9, 12 inches in depth, upon which is superimposed a charge of 15 gallons of cleansing solution 10. This particular cleansing solution is approximately of the following composition:—sodium sulphide ($Na_2S$) 3%, sodium hydroxide ($NaOH$) 25% and water 72%. The three reaction bottles are connected in series, the oil entering each vessel through the bottom distributing plate.

The motor fuel distillate is forced continuously through the system by a pump 12 under substantially atmospheric temperature conditions, passing from the storage tank 1 through the three reaction vessels 2, 3 and 4, and then into the settling tank 5, where any cleansing solution mechanically carried along by the distillate stream settles out, and finally issues therefrom as finished distillate. Replacement of the cleansing solution is made when it becomes spent with respect to solvent action on the sulphureted mercury.

The finished distillate so obtained is sweet or free from sour sulphur and non-corrosive or free from corrosive sulphur.

While I have described my process specifically with reference to motor fuel distillate with its natural sulphur content, sour and corrosive or both, I wish it to be understood that it is likewise effective for such distillate and other distillates from which the sour sulphur has been wholly or partially removed by any previous specific desulphurizing treatment, and is particularly effective for remoing free or elementary sulphur from any hydrocarbon oil.

What I claim as my invention and desire to secure by Letters Patent is:

1. The process of desulphurizing hydrocarbon oils which consists in subjecting the oil to be treated to the action of metallic mercury and simultaneously subjecting the metallic mercury to a water solution of an alkali sulphide.

2. The process of desulphurizing hydrocarbon oils which consists in subjecting the oil to be treated to the action of metallic mercury, and simultaneously subjecting the metallic mercury to a water solution of an alkali sulphide and an alkali hydroxide.

3. The process of desulphurizing hydrocarbon oils which consists in passing the oil upwardly first through a body of metallic mercury and through a solution of an alkali sulphide in contact with the body of metallic mercury.

4. The process of desulphurizing hydrocarbon oils which consists in passing the oil upwardly first through a body of metallic mercury and through a solution of an alkali sulphide and an alkali hydroxide in contact with the body of metallic mercury.

5. The process of desulphurizing hydrocarbon oils which consists in simultaneously subjecting the oil at substantially atmospheric conditions to the action of metallic mercury and subjecting the mercury to a water solution of an alkali sulphide.

6. The process of desulphurizing hydrocarbon oils which consists in simultaneously subjecting the oil at substantially atmospheric conditions to the action of metallic mercury and subjecting the mercury to a water solution of an alkali sulphide and an alkali hydroxide.

7. The process of desulphurizing hydrocarbon oils which consists in passing the oil at substantially atmospheric conditions through a body of metallic mercury which is in contact with a water solution of an alkali sulphide.

8. The process of desulphurizing hydrocarbon oils which consists in passing the oil at substantially atmospheric conditions through a body of metallic mercury which is in contact with a water solution of an alkali sulphide and an alkali hydroxide.

ROBERT C. MORAN.